United States Patent [19]

Riihinen

[11] 4,062,097
[45] Dec. 13, 1977

[54] ROLL HAVING MAGNETIC DEFLECTION COMPENSATION
[75] Inventor: Jaakko Riihinen, Jyvaskyla, Finland
[73] Assignee: Valmet Oy, Finland
[21] Appl. No.: 755,548
[22] Filed: Dec. 30, 1976
[30] Foreign Application Priority Data
  Dec. 31, 1975 Finland .................................. 753749
[51] Int. Cl.$^2$ ............................................. B21B 13/02
[52] U.S. Cl. ............................................. 29/116 AD
[58] Field of Search ...... 29/116 AD, 113 AD, 116 R, 29/132, 125, 110

[56] References Cited
U.S. PATENT DOCUMENTS

| 2,908,964 | 10/1959 | Appenzeller | 29/116 AD |
| 3,150,419 | 9/1964 | Aurich | 29/110 X |
| 3,392,432 | 7/1968 | Naumann | 29/110 |
| 3,397,439 | 8/1968 | Hanau | 29/116 R |
| 3,456,582 | 7/1969 | McClenathan | 29/116 AD X |
| 3,457,618 | 7/1969 | O'Neal et al. | 29/125 |
| 3,846,883 | 11/1974 | Biondetti | 29/116 AD |

Primary Examiner—Alfred R. Guest
Attorney, Agent, or Firm—Steinberg & Blake

[57] ABSTRACT

A deflection-compensated roll of the type which is adapted to be used in the calender or press section of a paper machine. The roll has an inner non-rotating axle and an outer shell surrounding and rotatable with respect to the axle, this axle and shell having a common axis. The axle includes an inner magnet structure while the shell includes an outer magnet structure which rotates together with the shell. These inner and outer magnet structures cooperate to provide attraction between the shell and axle on one side of the above axis and repulsion between the shell and axle on the opposite side of the above axis, to achieve in this way a deflection-compensation.

14 Claims, 5 Drawing Figures

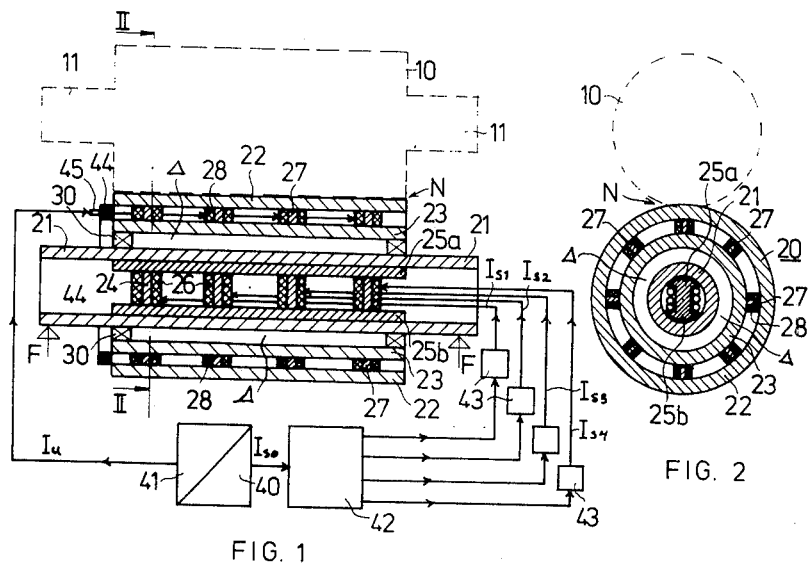
FIG. 1
FIG. 2
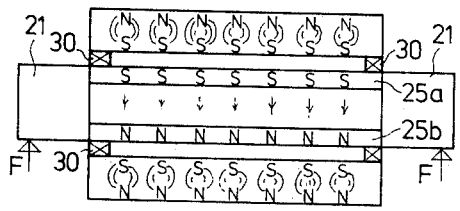
FIG. 3
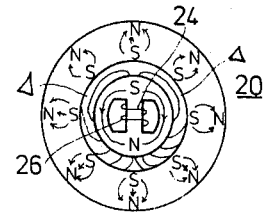
FIG. 4
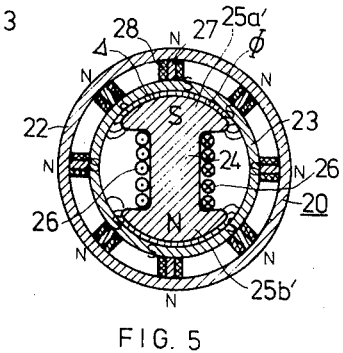
FIG. 5

ROLL HAVING MAGNETIC DEFLECTION COMPENSATION

BACKGROUND OF THE INVENTION

The present invention relates to rolls, and in particular to deflection-compensated rolls, of the type which are adapted to be used in the calender or press section of a paper machine.

Thus, the present invention relates to a roll compensated with respect to its deflection and on which a load is imposed at the ends of the roll. The roll has a non-rotating roll axle at the ends of which the load is applied, while a shell of the roll rotates about the axle thereof.

The deflection-compensated roll of the invention, which may have the load imposed at the ends thereof, is intended to be used in the pressure treatment of web-like sheet material while the latter passes through a nip defined between the roll of the invention and a mating roll. Thus, the roll of the invention is particularly suitable for use as a press roll or calender roll in a paper machine.

It is in general well known that rolls of the type referred to above, particularly when loaded by imposing a load at their ends, suffer deflection so that the linear pressure at the press nip is greater at the region of the outer ends of the nip as compared with the central region of the nip. Of course, attempts have already been made to avoid these drawbacks, for example by providing such rolls with a convex exterior surface. With conventional convex rolls, however, it is possible to obtain, for example, a uniform linear pressure only with a given load. In order to avoid this latter drawback it has already been proposed to provide controllable convex rolls an example of which are the known Kusters rolls (U.S. Pat. No. 2,908,964), wherein a pressure fluid chamber is situated between the stationary roll axle and the outer rotating roll shell at a given sector thereof. By controlling the pressure in such a pressure fluid chamber it is possible to compensate the deflection of the roll shell. However, such Kusters rolls suffer from the drawback of having sealing difficulties accompanied by unavoidable leakage of pressure fluid. A further drawback of these Kusters rolls resides in the fact that they respond relatively slowly to changes of pressure, an interval of approximately 30 seconds being required for an increase in pressure while an interval of approximately 10 seconds is required for a decrease in pressure to be effected. The consequence of these latter drawbacks is that when a change in pressure is brought about a considerable quantity of paper is wasted when such a roll is used in a paper machine.

Furthermore, there are known deflection-compensated rolls such as the so-called CC rolls wherein pressure shoes frictionally rub against the inner surface of the roll shell, a load being imposed on these shoes by way of a pressurized fluid. However, in the same way as with the Kusters rolls, such a construction also presents the drawback of having sealing difficulties, and in addition it is relatively difficult to provide for controls capable of achieving asymmetrical effects axially of the roll.

Press rolls which make use of electromagnetic forces are also known. In this connection reference may be made to U.S. Pat. No. 3,456,582. However, the roll disclosed in this latter patent is not loaded at its ends and is only of limited use in that it requires the press roll to have a magnetic roll cooperating therewith, with the press roll carrying magnetic structure for controlling the pressure with which the mating magnetic roll cooperates with the press roll.

SUMMARY OF THE INVENTION

It is accordingly a primary object of the present invention to provide a construction which will avoid the above drawbacks.

In particular, it is an object of the present invention to provide a deflection-compensated roll which has a much faster response to changes of compensation than has heretofore been possible.

It is also an object of the present invention to provide a deflection-compensated roll which makes it possible to bring about asymmetric corrections of the deflection.

Furthermore it is an object of the present invention to provide a deflection-compensated roll which brings about deflection-compensation by way of its own inherent structure and does not require a second mating roll of a particular construction to cooperate therewith.

Furthermore, it is an object of the present invention to provide a deflection-compensated roll which is made of a relatively simple rugged construction which is highly reliable in operation and which is capable of being controlled or regulated in a simple effective rapid manner for bringing about a desired deflection compensation and for changing from one deflection-compensation to another deflection-compensation.

According to the invention the deflection compensation is brought about by a magnetic structure. The roll shell is composed of a pair of substantially coaxial cylindrical parts between which a magnet means is situated while the non-rotating axle includes a second magnet means acting between opposite parts of the axle. By way of the combined action of the above magnet means of the axle and shell it is possible to produce with the structure of the invention magnetomotive forces in such a way that on one side of the common axis of the axle and shell, the axle and shell are attracted toward each other while on the opposite side of this common axis the axle and shell are repelled from each other.

Thus, the deflection-compensated roll of the invention includes a non-rotating axle means and a rotary shell means surrounding and rotatable with respect to the axle means, this axle means and shell means having a common axis. The axle means includes an inner magnet means while the shell means includes an outer magnet means which rotates together with the shell means. The inner and outer magnet means cooperate with each other for providing attraction between the shell means and axle means on one side of their common axis and repulsion between the shell means and axle means on the other side of their common axis.

BRIEF DESCRIPTION OF DRAWINGS

The invention is illustrated by way of example in the accompanying drawings which form part of this application and in which:

FIG. 1 is a schematic axial section of a deflection-compensated roll of the invention with FIG. 1 additionally showing in a diagrammatic manner the control structure associated with the deflection-compensated roll;

FIG. 2 is a transverse section of the roll of FIG. 1, taken along line II—II of FIG. 1 in the direction of the arrows, with FIGS. 1 and 2 both showing in phantom lines a roll which mates with the deflection-compensated roll of the invention;

FIG. 3 schematically illustrates a roll similar to that of FIG. 1 and having the same distribution of magnetic forces as the embodiment of FIG. 1 while FIG. 3 may be considered as differing from FIG. 1 in that in the embodiment of FIG. 3 the shell carries permanent magnets rather than electromagnets;

FIG. 4 is a schematic transverse elevation of the structure of FIG. 3 illustrating further how the magnetic fields are distributed; and FIG. 5 is a transverse sectional elevation of a further embodiment of the invention.

DESCRIPTION OF PREFERRED EMBODIMENTS

Referring to FIGS. 1 and 2, there is schematically illustrated therein a deflection-compensated roll 20 according to the present invention. This roll 20 includes an inner non-rotating axle means which includes an outer cylinder 21 in the embodiment of FIGS. 1 and 2. Within its outer cylinder 21 the axle means includes an inner magnet means described in greater detail below.

This inner, non-rotating axle means is surrounded by an outer shell means made by of coaxial outer and inner shells 22 and 23 which are spaced from each other and which are fixed to each other so as to rotate as a unit. In the space between the shells 22 and 23 of the rotary shell means is situated a magnet means which in the illustrated example includes a plurality of electromagnets each including an inner magnetic core 27 and an outer coil 28 surrounding the core 27. These cores 27 may be fixed at their outer ends directly to the shells 22 and 23 so as to connect them to each other for rotation as a unit. The rotary shell means which thus includes the inner shell 23, the outer shell 22 and the magnet means 27, 28 situated therebetween is magnetized so that at the entire inner surface of the inner shell 23 the direction of the magnetic flux $\Phi$ is the same with respect to the common axis of the shell means and axle means.

As was indicated above, the axle means includes the outer cylinder 21 which houses in its interior an inner magnet means which in the illustrated example includes magnetic cores 24 distributed along the axis of the axle means and each surrounded by a coil 26. Thus, the axle means also includes a magnet means in the form of electromagnets. The magnetization produced at the axle means is such that on the one side of the common axis of the axle means and shell means the direction of the magnetic flux is toward this common axis while on the opposite side of the common axis the direction of magnetic flux is away from the common axis.

Thus, between the rotary inner shell 23 of the shell means and the cylinder 21 of the axle means magnetic fields are produced which attract the shell means and axle means toward each other on one side of their common axis and repel them from each other on the other side of their common axis. As a result the shell means and axle means undergo a deflection with respect to their common axis. Inasmuch as the axle means is stationary while the shell means rotates, and the magnetic field of the shell means is symmetrical with respect to the axis of rotation, the direction of deflection remains the same at all times. These characteristics are utilized in accordance with the invention to achieve, for example, a uniform lineal pressure at the line of contact of rolls which have a load imposed at their ends.

FIGS. 1 and 2 schematically illustrate in phantom lines a roll 10 which mates with the deflection-compensated roll 20 of the invention, this roll 10 defining with the roll 20 the nip N, the lineal pressure of which is controlled by way of the present invention by utilizing the magnetic fields as set forth above.

As is apparent from FIG. 1, the shell means 22, 23 is supported for rotation on the axle means, at the cylinder 21 thereof, by way of bearings 30. The axle means is loaded at its ends, as indicated by the arrows F at the outer end regions of the cylinder 21. The loading structure and specific bearing structure have not been shown in detail inasmuch as these features are similar to corresponding features utilized in known deflection-compensating rolls. In general, the deflection-compensation of the present invention is brought about in that the outer magnet means 27, 28 situated between the shells 22 and 23 of the shell means generate a magnetomotive force $\theta v$ while a second magnetomotive force $\theta a$ is generated by the inner magnet means 24, 26 which forms part of the nonrotating axle means. By way of the combined action of the magnetic fields produced by these two magnet means, the magnetomotive forces $\theta v$ and $\theta a$ arise between the axle means and shell means producing attraction on one side and repulsion on the other side of the common axis, and these forces produce the deflection required for compensation.

In the particular example shown in FIGS. 1 and 2, while the cores 24 of the inner magnet means extend perpendicularly across the common axis of the axle means and shell means, they terminate short of the inner surface of the cylinder 21 of the axle means. Between these cores and the inner surface of the cylinder 21 are a pair of pole shoes 25a and 25b which are parallel to each other and to the common axis, the cores 24 extending between these pole shoes and each core 24 being fixed at its opposite ends to the pole shoes, providing the structure which is schematically indicated in FIG. 2 in particular. The cylinder 21 of the axle means may be made of a magnetic material or of a non-magnetic material such as bronze. In any event, however, the reluctance which is provided between the pole shoes 25a and 25b is superior to the reluctance $\Delta$ of the air gap defined between the outer surface of the cylinder 21 and the inner surface of the shell 23, so that in this way a sufficiently high magnetic flux $\Phi$ is obtained.

As is apparent from FIG. 2, the outer magnet means 27, 28 are distributed circumferentially around the common axis, while this outer magnet means is also distributed along the common axis, as is apparent from FIG. 1. The inner magnet means 24, 26, together with the pole shoes 25a and 25b is situated, however, only longitudinally along this common axis.

Referring to FIG. 5, in this case the non-rotating axle means does not include a cylinder such as the cylinder 21. Instead it is made up only of the several magnetic cores 24 which are interconnected at their ends by the pole shoes 25a' and 25b'. These pole shoes are connected at their outer unillustrated ends with suitable tubular journal pins and they carry the bearings corresponding to the bearings 30 of FIG. 1 which support the shell means for rotation with respect to the axle means.

Referring to FIG. 1, the supply of electrical energy to the magnetizing coils 26 and 28 is schematically illustrated. The magnetizing current for the magnetizing coils 28 of the shell means is supplied from the schematically illustrated current source 41 through one or more slip rings 44 connected to the shell means for rotation therewith and engaged by carbon brushes 45 with respect to which the slip rings rotate and slide. The current for the coils 26 of the non-rotating axle means is supplied without utilizing slip rings. This supply is from the current source 40 which supplies the current $I_{SO}$ to the regulator 42 which in turn transmits the current respectively to the several coils 26 by way of separate common control units 43. In this way it is possible to adjust and control the relative magnitudes of the ratio of the currents $I_{S1}$, $I_{S2}$, $I_{S3}$, $I_{S4}$, etc. supplied to the several coils 26. The purpose of independently controlling the currents supplied to the several coils 26 is to enable the magnitude of the deflection compensation-producing force to be controlled longitudinally of the axle means, for example, in such a manner that asymmetric corrections of the lineal pressure may be produced, if desired.

The purpose of the control means illustrated by the block 42 is to adjust the intensity of all of the currents respectively flowing to the several coils 26. In other words the relationship between the currents flowing to the several coils 26 can be regulated by way of the separate control units 43, whereas without changing this relationship it is possible to increase or decrease all of these currents by way of the common control unit 42.

As is apparent from FIG. 1, it is more advantageous to render the magnetizing currents of the inner magnet means of the axle means separately controllable instead of providing equivalent controls for the currents of the electromagnets of the shell means inasmuch as the currents to the rotating shell means must be conducted by way of slip rings.

The magnetization provided with the structure of the invention can be produced either by direct current or alternating current. Direct current is advantageous with respect to the design of the equipment, for example, for the reason that the parts to be magnetized may be made of solid iron without incurring any risk of losses. On the other hand, when direct current is employed there is the drawback of hysteresis, with respect to which alternating current is superior. The use of alternating current for the magnetization may also be more advantageous with respect to the control of the currents.

The air gap Δ illustrated in the drawings is made small enough to enable a sufficient magnetic flux density B to be obtained in this air gap. The air gap Δ will in actual practice most likely be on the order of about 10 mm.

Instead of utilizing electromagnets, it is also possible to utilize permanent magnets for the magnetization according to the invention. Thus, FIGS. 3 and 4 schematically illustrate an arrangement similar to that of FIGS. 1 and 2 except that the schematically illustrated magnets of the shell means are permanent magnets. However these permanent magnets may of course be the electromagnets 27, 28 as described above in connection with FIGS. 1 and 2. FIGS. 3 and 4 illustrate how the magnetic fields are arranged. Thus it will be seen from FIGS. 3 and 4 that above the common axis of the axle means and shell means the inner and outer magnet means are arranged so that the permanent magnets or electromagnets of the shell means provide south poles at the inner surface of the inner shell 23, while the upper pole shoe 25a also has a south polarity, thus providing repulsion between the shell means and axle means above the common axis thereof, as viewed in FIGS. 3 and 4. On the other hand, while the permanent magnets or electromagnets of the shell means still provide south poles at the inner surface of the inner shell 23 below the common axis of the axle means and shell means in FIGS. 3 and 4, the lower shoe 25b has a north polarity, so that below the common axis of the axle means and shell means, these components are attracted toward each other. It is apparent, therefore, that with the structure of the invention attraction is provided between the shell means and axle means on one side of their common axis and repulsion on the other side of their common axis. Furthermore it will be noted that the pole shoes 25a and 25b are situated in the plane which contains the common axis of the axle means and shell means as well as the axis of the mating roll 10, so that this deflection-compensating force produced by attraction on one side and repulsion on the other side of the common axis of the axle means and shell means acts in the plane which contains the line of contact between the rolls, or in other words in the plane which includes the nip N.

Thus, with respect to the possibility of eliminating slip rings the use of permanent magnets in the shell means is advantageous. The use of electromagnets at least for the axle means is advantageous in that not only is it possible in this way to provide for convenient regulation of the deflection, but in addition it is simple by way of the controls such as the unit 42 to reverse the magnetizing current direction so as to reverse the direction of deflection compensation in a rapid simple manner. This of course is a considerable advantage particularly with respect to calender rolls.

The invention of course is not to be narrowly confined to the details presented above and shown in the drawings, inasmuch as these details may vary greatly within the scope of the inventive concept set forth by the claims which follows.

What is claimed is:

1. In a deflection-compensated roll assembly of the type adapted to be used in a calender or press section of a paper machine, inner non-rotating axle means and outer rotary shell means surrounding and rotatable with respect to said axle means, said inner axle means and outer shell means having a common axis and said inner axle means including an inner magnet means while said outer shell means includes an outer magnet means which rotates together with said outer shell means, said inner and outer magnet means cooperating for atracting said shell means and axle means toward each other on one side of said axis and for repelling said shell means and axle means from each other at an opposite side of said axis.

2. The combination of claim 1 and wherein said outer shell means includes coaxial inner and outer shells which define between themselves a space in which said outer magnet means is situated.

3. The combination of claim 2 and wherein said inner and outer shells are made of a magnetic material.

4. The combination of claim 2 and wherein said outer magnet means includes a plurality of permanent magnets situated between said shells.

5. The combination of claim 2 and wherein said outer magnet means includes a plurality of electromagnets situated between said shells.

6. The combination of claim 5 and wherein said outer shell means includes at least one slip ring electrically connected with said electromagnets.

7. The combination of claim 1 and wherein said inner axle means and outer shell means define between themselves an air gap in which a magnetic flux acts to provide deflection compensation.

8. The combination of claim 7 and wherein said air gap has a radial dimension on the order of approximately 10 mm.

9. The combination of claim 7 and wherein said inner magnet means includes a plurality of magnetic cores distributed along and extending across axis, a pair of pole shoes situated on opposite sides of and extending along said axis while being parallel thereto, said cores being situated between said pole shoes and each core being connected at opposite ends thereof to said pole shoes, and a plurality of coils respectively surrounding said cores.

10. The combination of claim 9 and wherein a control means is operatively connected with said coils for controlling the magnitude and distribution of the attraction and repulsion of the shell means and axle means with respect to each other along said axis.

11. The combination of claim 9 and wherein said outer shell means has an inner surface while said pole shoes respectively have outer surfaces cooperating with said inner surface to define said air gap.

12. The combination of claim 7 and wherein said inner axle means includes a hollow cylinder in which said inner magnet means is situated, said cylinder having an outer surface and said shell means having an inner surface spaced from and surrounding said outer surface of said cylinder and defining said air gap therewith.

13. The combination of claim 1 and wherein a control means is operatively connected with at least one of said magnet means for controlling the magnitude and distribution of the attraction and repulsion of said shell means and axle means with respect to each other along said axis.

14. The combination of claim 13 and wherein said control means is capable of reversing the direction of deflection compensation.

* * * * *